April 12, 1966   WING GEE CHENG   3,246,136
PARKING LIGHTS FOR VEHICLES
Filed Feb. 28, 1964   2 Sheets-Sheet 1
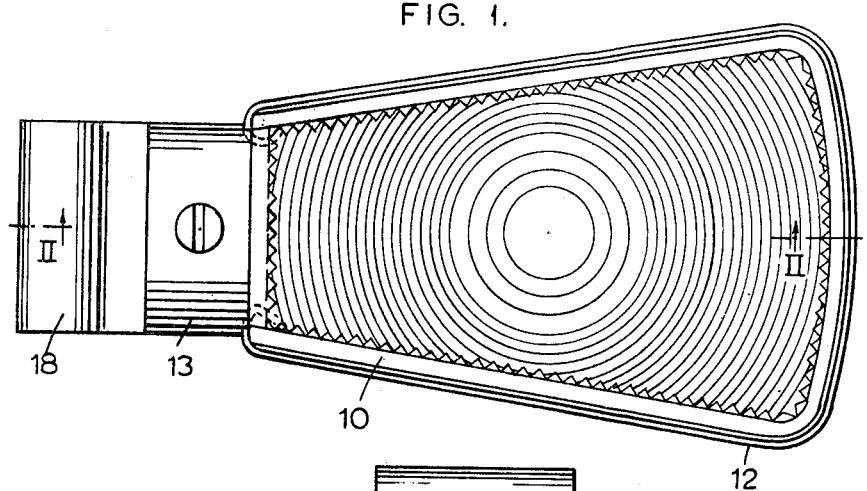
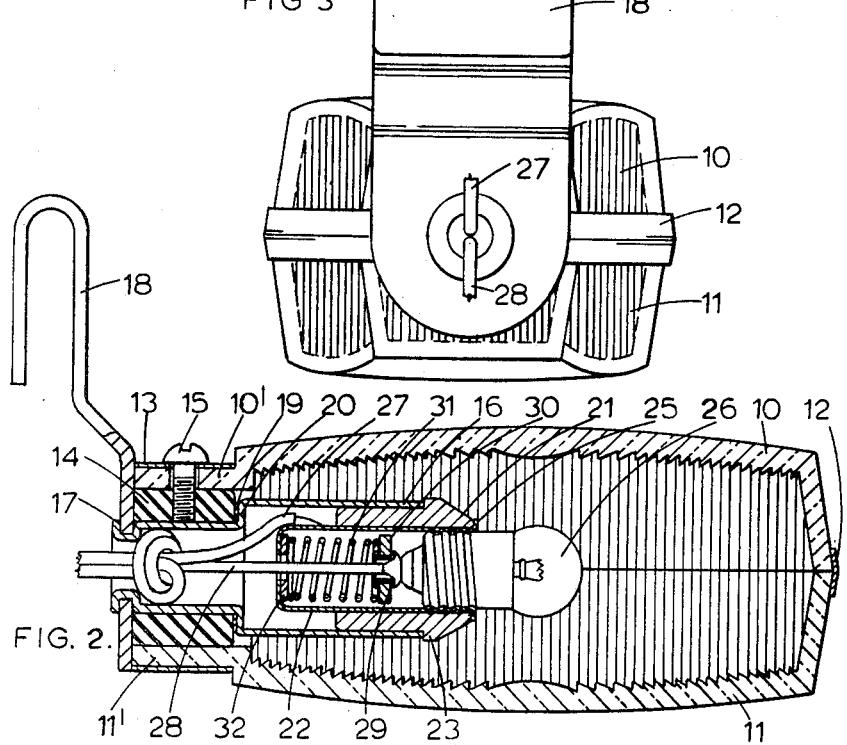
INVENTOR
WING GEE CHENG April 12, 1966  WING GEE CHENG  3,246,136
PARKING LIGHTS FOR VEHICLES
Filed Feb. 28, 1964

INVENTOR
WING GEE CHENG
By Shoemaker and Mattare
Attys.

United States Patent Office 3,246,136
Patented Apr. 12, 1966

3,246,136
PARKING LIGHTS FOR VEHICLES
Wing G. Cheng, 1 Forfar Drive, Kowloon, Hong Kong
Filed Feb. 28, 1964, Ser. No. 348,142
Claims priority, application Great Britain, Mar. 1, 1963,
8,325/63; May 3, 1963, 17,698/63
5 Claims. (Cl. 240—8.22)

This invention relates to parking lights for vehicles and has for its object to provide a parking light of relatively simple and cheap construction which can be readily reversed so that it can be placed on either side of the vehicle.

With the foregoing object in view a vehicle parking light made in accordance with the invention comprises a lampshade made in two symmetrical parts, one of the two parts comprising a red cover glass and the other part comprising a clear white cover glass, a tubular boss formed at one end of the shade, a bushing secured inside the tubular boss, a fitting comprising a sleeve mounted at one end in said bushing and projecting into the shade, said sleeve being in frictional contact with said bushing but so as to permit relative rotation between the contacting surfaces of said sleeve and said bushing, a lamp bulb holder mounted in said sleeve, and a mounting bracket fixed to said sleeve so as to be rotatable therewith relatively to the shade.

In the accompanying drawings which illustrate how the invention may be carried into effect:

FIG. 1 is a plan view of a parking light made in accordance with the invention;

FIG. 2 is a vertical section taken on line II—II, FIG. 1;

FIG. 3 is an end view; and

Figure 4:
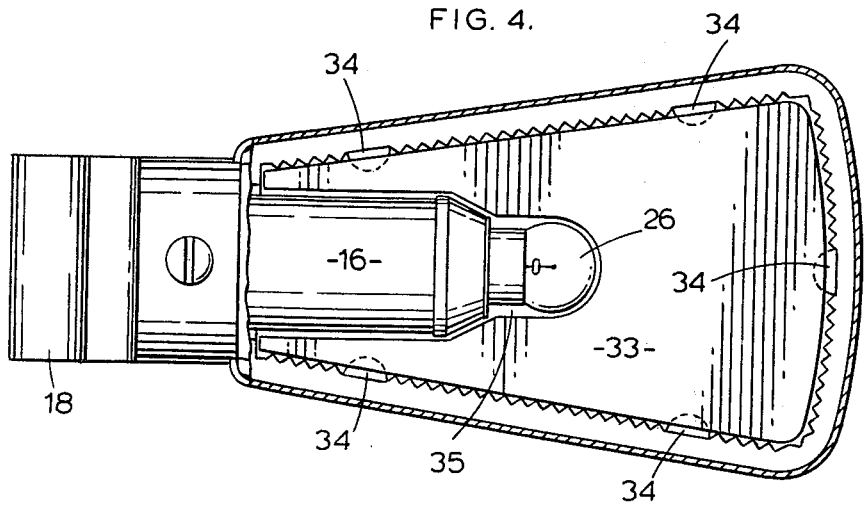
FIGS. 4 and 5 are respectively sectional plan and side views of a modified construction.

The lampshade shown in the drawings is made in two symmetrical half parts 10, 11 moulded from synthetic plastics material, the part 10 being moulded from clear (transparent) synthetic plastics material and the part 11 being moulded from red coloured transparent plastics material. The two parts of the shade are of truncated triangular shape having a substantially U-shape in cross section, the wider end being substantially rectangular and the smaller end terminating in a semicircular neck portion 10′ or 11′. The two parts are cemented together with the parting line in a plane parallel to the triangular surfaces, the joint being concealed by a metal strip 12 extending around the sides and wider closed end of the shade, the ends of the strip being bent back and passed through slits in the walls adjacent the semicircular neck portions 10′, 11′ which together form a tubular boss of circular shape. This boss is surrounded by a metal ring 13 which maintains the circular shape and reinforces the boss against possible bursting due to an external cause. A bushing 14 is fitted inside the boss 10′, 11′ which is secured to the bush and to the metal ring 13 by a screw 15 which passes through apertures in the metal ring 13 and boss 10′, 11′ and engages in a tapped aperture in the bushing 14. This bush is mounted on the outer end of a sleeve 16 which extends through the bushing and projects into the interior of the shade, the outer end of the sleeve being of reduced diameter and engaging in the bushing in frictional contact with the surface thereof. The arrangement is such that relative rotation between the sleeve 16 and bushing 14 can take place against the frictional resistance opposed by the contacting surfaces. The outer end of the sleeve projects somewhat beyond the outer end of the bushing and the projecting end is formed with a peripheral groove 17 to receive a mounting bracket 18 which bears against the outer end of the bushing 14. The bracket 18 is tightly engaged in the groove 17, the outer side of which is formed by peening over the end of the sleeve 16 onto the bracket which is shaped to clip over the edge of a window glass or like support. The inner end of the bushing 14 bears against a spring washer 19 interposed between the bushing and a shoulder 20 formed by the larger diameter part of the sleeve 16, this spring washer serving to maintain the required degree of friction between the bushing and the sleeve notwithstanding wear in use. An insulating tube 21 constituting a support for a lamp bulb holder 22 is inserted in the inner end of the sleeve, inward movement of this tube in the sleeve being limited by an enlarged diameter part 23 which bears on the end of the sleeve. The lamp bulb holder 22 is inserted into the end of the tube 21, inward movement of this holder being limited by a lip or flange 25 on the end thereof which bears against the end of the tube 21. The latter has a push fit in the sleeve 16 and the lamp bulb holder 22 has a push fit in the insulating tube 21. A lamp bulb 26 is screwed into the open threaded end of the holder 22. The electrical connections consist of two flexible insulated conductor wires 27, 28 of which the conductor 27 connects the negative terminal of a supply battery to the shell of the lamp bulb holder, while the conductor 28, connected to the positive terminal of a supply battery passes through an aperture in the closed end of the holder and through the holder and is soldered to an eyelet or hollow rivet 29 carried in a washer 30 disposed in the holder closely adjacent to the centre terminal of the lamp bulb. A coil spring 31 disposed in the holder bears at one end against this washer 30 and at the other end against another washer 32 in the holder adjacent the closed end thereof and serves to press the soldered surface of the eyelet 29 into electrical contact with the centre terminal of the lamp bulb.

In use the bracket 18 can be turned relatively to the shade against the resistance to turning opposed by the contacting surfaces of the sleeves 16 and bushing 14 into a desired position for mounting the light on a support (e.g., the edge of a window) on either side of a vehicle, the bracket being retained in the adjusted position by friction between these contacting surfaces.

The lamp circuit is as follows:

Positive terminal of the battery: Flexible conductor 28, eyelet 29, centre contact of lamp bulb 26, shell of lamp bulb holder 22, flexible conductor 27, negative terminal of the battery.

Figure 5:
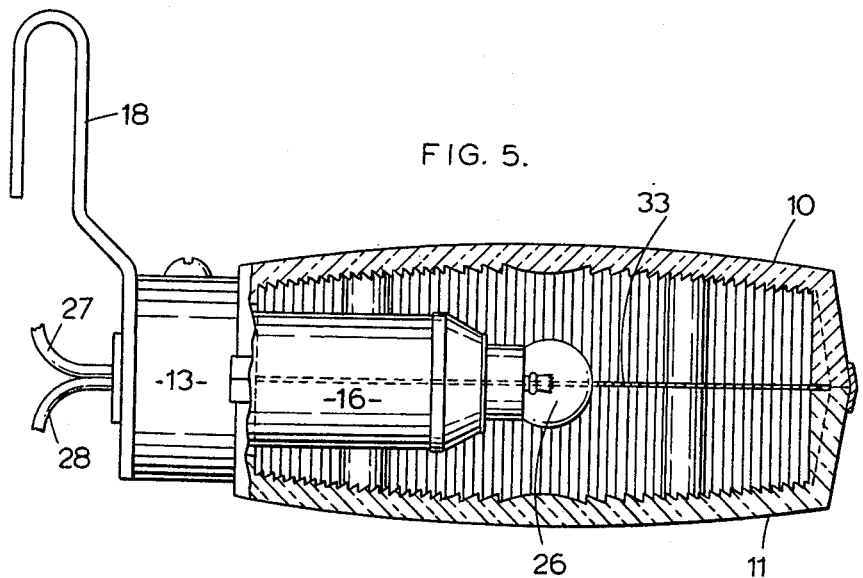

In the modified construction illustrated in FIGS. 4 and 5, in which figures like parts are denoted by like reference numerals means are provided for separating the colours from the two differently coloured halves of the shade, which colours might otherwise become mixed by internal reflection. In one embodiment these means comprise a partition 33 made for example of metal and preferably of white colour disposed in the shade in the plane between the clear (white) lens or cover glass 10 and the red lens or cover glass 11. The partition is disposed and retained in position between lugs or projections 34 moulded integrally with each half of the shade. In the present embodiment five such lugs or projections are provided on each half of the shade, two being spaced along each side and one centrally of the closed end of each half of the shade. The lugs or projections 34 are symmetrically located in the two halves of the shade so that when the two halves are fitted together the lugs or projections on one half are oppositely disposed to those on the other half. The edges of the partition are retained between the opposed ends of the lugs or projections which extend in close proximity to the edge of the half shade but so as to leave sufficient clearance to receive the edge of the partition. The part of the partititon adjacent the lamp bulb is formed with a slot 35 to accommodate the lamp bulb 26 and sleeve 16 in which the bulb is mounted. This arrangement enables the lamp bulb to be removed and replaced without moving the metal partition. The partition prevents mixing by internal reflection of the colours of the two halves of the shade so that each colour can be clearly seen on the appropriate side of the shade.

I claim:
1. A vehicle parking light comprising a lampshade made in two symmetrical parts, one of the two parts comprising a red cover glass and the other part comprising a clear white cover glass, a tubular boss formed at one end of the shade, a bushing secured inside the tubular boss, a fitting comprising a sleeve mounted at one end in said bushing and projecting into the shade, said sleeve being in frictional contact with said bushing but so as to permit relative rotation between the contacting surfaces of said sleeve and said bushing, a lamp bulb holder mounted in said sleeve, and a mounting bracket fixed to said sleeve so as to be rotatable therewith relatively to the shade.

2. A vehicle parking light according to claim 1, comprising an abutment surface formed on the sleeve on the inner side of the bushing and a spring washer interposed between the said bushing and said abutment surface, said bushing bearing against said spring washer.

3. A parking light according to claim 1, comprising an insulating tube fitted in said sleeve said lamp bulb holder being fitted in said insulating tube.

4. A parking light according to claim 1, comprising an insulating tube fitted in said sleeve, said lamp bulb holder being fitted in said insulating tube, a lamp bulb screwed into an open end of said lamp bulb holder, contact means adapted to connect the positive terminal of a supply battery to the lamp bulb, and a spring disposed in said lamp bulb holder and operating to press said contact means into contact with the centre terminal of the lamp bulb.

5. A parking light according to claim 1, comprising an insulating tube fitted in said sleeve, said lamp bulb holder being fitted in said insulating tube, a lamp bulb screwed into an open end of said lamp bulb holder, contact means adapted to connect the positive terminal of a supply battery to the lamp bulb, said contact means comprising a terminal carried on a washer, and a spring disposed in said lamp bulb holder and bearing against said washer to press said terminal into contact with the centre terminal of the lamp bulb.

References Cited by the Examiner
UNITED STATES PATENTS

| | | | |
|---|---|---|---|
| 2,446,455 | 8/1948 | Bowman | 240—100 X |
| 2,738,414 | 3/1956 | Davis et al. | 240—8.22 |
| 2,806,937 | 9/1957 | Hollins | 240—8.22 |
| 2,830,171 | 4/1958 | Buck | 240—8.2 |
| 2,850,622 | 9/1958 | Johnson | 240—81 |

FOREIGN PATENTS

| | | |
|---|---|---|
| 236,676 | 12/1961 | Australia. |
| 847,567 | 9/1960 | Great Britain. |

NORTON ANSHER, *Primary Examiner.*